Feb. 20, 1951 C. W. McCARTY ET AL 2,542,692
ARMATURE LOCK
Filed Jan. 6, 1950

Inventors:
Clyde W. McCarty,
Fred B. Jennings,
by Russell A. Warner
Their Attorney.

Patented Feb. 20, 1951

2,542,692

UNITED STATES PATENT OFFICE 2,542,692

ARMATURE LOCK

Clyde W. McCarty, Lynn, and Fred B. Jennings, Beverly, Mass., assignors to General Electric Company, a corporation of New York Application January 6, 1950, Serial No. 137,102

1 Claim. (Cl. 171—95).

Our invention relates to means for locking and unlocking the rotating element of measuring instruments and is particularly adapted as an armature lock for delicate electric measuring instruments, such as those used in exposure meters, and will be explained as for such use. The object of our invention is to provide a reliable armature lock of simple, low-cost construction, directly movable from locking to unlocking position and vice versa by push button control and which, when in armature locking position, firmly locks the armature but without damaging forces on the armature or its delicate pivot mounting. The locking action is accomplished without any tendency to turn the armature from its true measurement position, and hence, when locked the instrument gives identically the same measurement indication as existed just prior to such locking action.

The features of our invention which are believed to be new and patentable will be pointed out in the claim appended hereto. For a better understanding of our invention reference is made in the following description to the accompanying drawing which illustrates in Fig. 1 a face view of an exposure meter, partially in section, to which our invention has been applied. Fig. 2 is a partially sectional side view of the exposure meter of Fig. 1 taken along line 2—2 of Fig. 1. Fig. 3 is a perspective view of a preferred form of our armature lock as it would appear when removed from the exposure meter of Fig. 1.

Figure 1:
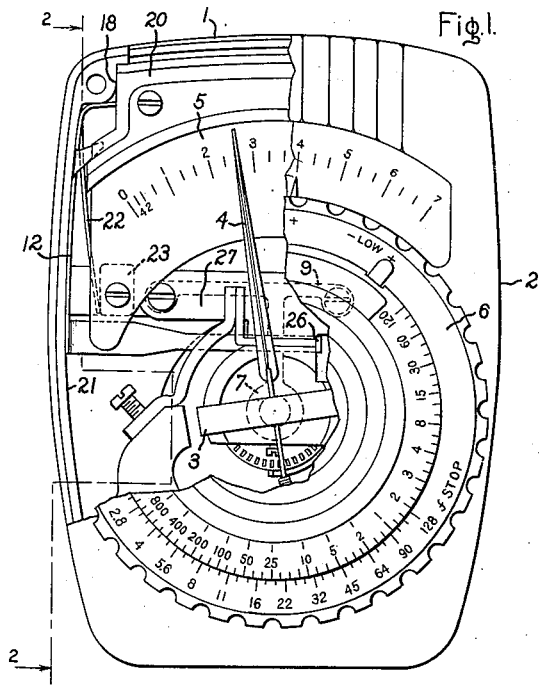
Figure 2:
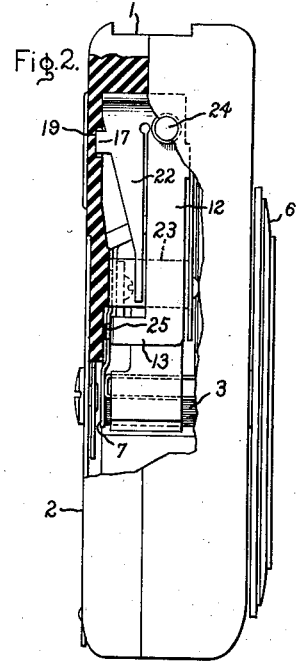
Figure 3:
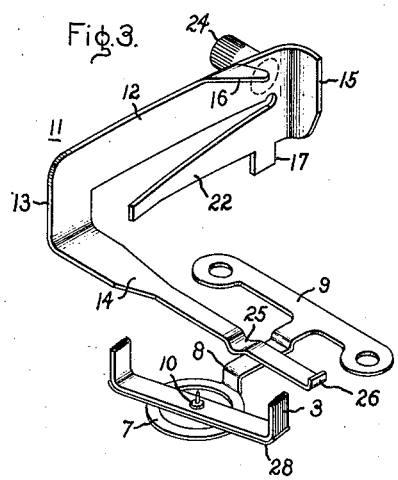

Referring first to Figs. 1 and 2 of the drawing, we have here represented an exposure meter and calculator of the kind used by photographers for measuring light conditions and calculating exposure time, lens opening, and the like preparatory to taking a picture. Such instruments contain a photosensitive cell which when exposed to the prevailing light, as through a window 1, generates an electric current which is proportional to the light intensity. Such current is measured by a sensitive electrical measuring instrument contained within the casing 2 of the device, and in the present illustration this instrument has a pivoted armature coil 3 through which flows current from the photocell to produce a measurement deflection of a pointer 4 indicating on a stationary scale 5. In the operation of the device the prevailing light value is measured and indicated by the position of pointer 4 on scale 5. This measured value is then used in adjusting the setting of the exposure calculator which is shown mounted on the front side of the casing at 6. After a light value measurement has been taken it in desirable to retain such measurement during the adjustment of the calculator. Heretofore, this has been done by locking the pointer in its measurement position by apparatus which was somewhat complicated and bulky for the crowded space available by reason of the fact that the pointer has a considerable range of movement and the requirement that it be locked in any measurement position. According to our invention we provide locking apparatus operating upon the armature instead of the pointer.

Our armature lock includes a ring-shaped part 7 concentric with the axis of rotation of the armature coil 3 and adapted lightly to engage the bottom of the armature coil on the end remote from the pointer 4 when moved to armature locking position. This ring 7 is integral with and on the end of a resilient arm 8 secured to the back wall of the casing or other support in the casing as by rivets or screws passing through the openings in the head part 9. The resilient arm 8 is bent to such a position that when otherwise unrestrained it presses ring 7 lightly and evenly upward against the underside of the armature coil 3 in an axial direction, and firmly but gently locks such armature from movement against any deflection or zero return spring torque that may exist. The arm 8 is on a radius which does not interfere with the range of rotation of the coil 3. The electrical measuring instrument which is only partially represented here is of a type which has its lower spiral and pivot within the armature coil. Thus, in Fig. 3, the lower internal pivot is represented at 10. More complete details of an exposure meter and its measuring instrument of the type here contemplated are shown and described in copending application Serial No. 777,086, filed September 30, 1947, to Stimson et al. and assigned to the same assignee as the present invention.

It will be noted that while an internal pivot 10 is represented, our armature lock could be applied to an external pivot instrument because the opening in ring 7 which is concentric to the axis of rotation of the armature coil 3 allows ample room for an external pivot on the axis of rotation. The means for moving the armature lock 7 from and to locking position consists of a member 11 formed from a single piece of resilient sheet material. The armature locking parts 7, 8, and 9 are likewise formed from a single piece of resilient sheet material. The member 11 has an elongated section 12 which extends in a vertical direction close to and along the left side wall of the casing 2 as viewed in Fig. 1. At 13 is a rearward extension and at 14 there is a lateral extension in the member 11, such that arm extension 14 lies adjacent the back wall of the casing and crosses close to and above arm 8 of the armature lock.

The operating member 11 is secured in the casing at the upper head end of part 12 in any suitable way. In the present instance it is provided with angular projections at 15, 16, and 17 for this purpose, so arranged in relation to stationary parts of the instrument and casing that the member 11 may be sprung into place by hand where it will be retained without other fastening means. Thus, the head part 15 rests against the upper outer vertical wall 18 of a cell box. The tab 17 goes into a recess 19 in the inner back wall of the casing, and the tab 16 slides behind a plate 20 which forms the front wall of the cell box and a backing for the scale plate 5, while the part 12 normally rests against the inner side wall 21 of the casing 2. A branch section 22 also extends downward from the head part at 15 and is bent from part 12 sufficiently to rest against a post 23 such that there is spreading tension between parts 22 and 12, pressing part 12 against the inner side wall 21 of the casing. A push button 24 extends through the upper half of the casing opposite the top end of part 12, and its inner end rests against part 12. This button is not shown in Fig. 1 because the top section of the casing in which it is contained is shown broken away at this point, but its position is shown in Figs. 2 and 3. By pushing in on this button the parts 12, 13 and 14 are moved to the right against the spreading tension that exists between parts 12 and 22. In this movement the head part at 15 of operating member 12 remains essentially stationary and acts as a pivot for the movement. Part 12 moves away from wall 21, and extension 14 is moved to the right across arm 8 of the armature lock. When the push button pressure is removed, the parts spring back to the positions indicated in Figs. 1 and 3. A hump 25 is pressed into extension 14 adjacent to where it crosses arm 8 and when the push button 24 is pressed in, this hump 25 slides across and presses downward on arm 8 and moves the lock 7 away from the armature 3 so that the armature is free to rotate. The resulting wedging action is smooth and noiseless.

Thus, the armature coil 3 is locked and unlocked by a small movement of arm 14 to the left and right by releasing and pushing in on the button 24, the parts normally being in the armature locking position. The free end of arm 14 is bent upward at 26 to slide against the lower edge of a core support plate 27 and serves to guide arm 14. The armature coil may have some extra covering protection as represented at 28 where the armature lock 7 contacts the same.

It is seen that our armature lock consists of two sheet metal resilient arms each secured at one end, with the free end of the locking arm adjacent one end of the armature and with a free end portion of the releasing arm in operative engagement with an intermediate portion of the locking arm, such that when the releasing arm is moved from locking to releasing position against its bias, the locking arm is depressed and the armature is unlocked. These arms are formed and positioned so as not to interefere with other essential parts of a compact instrument. The armature lock bears lightly and evenly on the armature symmetrically with respect to its axis of rotation in a manner to avoid side thrust or pivot and jewel damage. Frictional contact is made with the armature sufficiently removed from the axis of rotation that the contact pressure does not have to be large in order to be effective. The locking action has no tendency to rotate the armature in either direction at any armature position.

What we claim as new and desire to secure by Letters Patent of the United States is:

In combination, a measuring instrument, a casing in which said instrument is enclosed, an armature for said instrument pivoted about an axis of rotation, an armature lock therefor comprising a resilient locking arm having one end secured in fixed relation with said casing and its other end terminating closely adjacent to an axial end surface of said armature, said arm being adjusted normally to bias its last-mentioned end axially against said armature without side thrust thereon to lock the same against rotation, a lock releasing resilient arm having one end secured in said casing and its other end portion extending into operative relation with an intermediate portion of said locking arm, said releasing arm being movable between a lock releasing position where it depresses said locking arm to unlock the armature and a locking position where it is withdrawn from depressing relation with the locking arm and the armature is locked, said lock releasing arm being biased to locking position, and manually operative means extending from the exterior to the interior of said casing for moving the releasing arm to lock releasing position.

CLYDE W. McCARTY.
FRED B. JENNINGS.

REFERENCES CITED

The following references are of record in the file of this patent:

UNITED STATES PATENTS

| Number | Name | Date |
| --- | --- | --- |
| 2,237,552 | Ellis | Apr. 8, 1941 |
| 2,285,471 | Sturgess | June 9, 1942 |